United States Patent
Park

(10) Patent No.: US 8,955,150 B2
(45) Date of Patent: Feb. 10, 2015

(54) APPARATUS AND METHOD FOR MANAGING DIGITAL RIGHTS USING VIRTUALIZATION TECHNIQUE

(75) Inventor: Chel Park, Seoul (KR)

(73) Assignee: Fasoo.com Co. Ltd., Seoul (KR)

( * ) Notice: Subject to any disclaimer, the term of this patent is extended or adjusted under 35 U.S.C. 154(b) by 0 days.

(21) Appl. No.: 13/391,801

(22) PCT Filed: Sep. 10, 2010

(86) PCT No.: PCT/KR2010/006182
§ 371 (c)(1),
(2), (4) Date: Feb. 22, 2012

(87) PCT Pub. No.: WO2011/031093
PCT Pub. Date: Mar. 17, 2011

(65) Prior Publication Data
US 2012/0159648 A1   Jun. 21, 2012

(30) Foreign Application Priority Data

Sep. 10, 2009  (KR) ................. 10-2009-0085573

(51) Int. Cl.
*G06F 21/00* (2013.01)
*H04L 29/06* (2006.01)
(Continued)

(52) U.S. Cl.
CPC ............. *H04L 63/10* (2013.01); *G06F 21/10* (2013.01); *G06F 21/53* (2013.01); *G06F 2221/2149* (2013.01); *H04L 2463/101* (2013.01)
USPC ........ 726/28; 726/2; 726/12; 726/13; 726/14; 726/15; 726/16; 726/17; 726/26; 726/27; 726/29; 726/30; 713/164; 713/165; 713/166; 713/167; 713/182; 713/183; 713/184; 713/185; 713/186

(58) Field of Classification Search
CPC ................... G06F 9/45533; G06F 9/45504
USPC .......... 713/164–167, 182–186; 726/26–30, 2, 726/12–17
See application file for complete search history.

(56) References Cited

U.S. PATENT DOCUMENTS 7,784,088 B2 * 8/2010 Darbha et al. ............... 726/4
8,261,320 B1 * 9/2012 Serenyi et al. ............... 726/2
(Continued)

FOREIGN PATENT DOCUMENTS

JP   2002-207600   7/2002
JP   2006-260176   9/2006
(Continued)

OTHER PUBLICATIONS

Yuichi Nino, A Digital Rights Management System, Information Processing Academy Research Report, vol. 2003 No. 17, Feb. 22, 2003, pp. 33-40.
JP Office Action for corresponding application JP 2012-526672.

*Primary Examiner* — Josnel Jeudy
(74) *Attorney, Agent, or Firm* — Gottlieb, Rackman & Reisman, P.C.

(57) ABSTRACT

The present invention relates to an apparatus and a method for managing digital rights using virtualization technique, and more particularly to an apparatus and a method for enabling a user to access a desired text file in an independent area through a virtual machine corresponding to a licensed right for accessing the text file. The present invention comprises a virtual machine (VM) management unit for controlling a user access authorization function for accessing the text file in the area to which the virtualization technique is applied.

20 Claims, 7 Drawing Sheets

(51) Int. Cl.
*G06F 21/10* (2013.01)
*G06F 21/53* (2013.01)

(56) References Cited

U.S. PATENT DOCUMENTS

| | | | | |
|---|---|---|---|---|
| 8,359,600 | B2* | 1/2013 | Kang et al. | 718/104 |
| 8,370,899 | B2* | 2/2013 | Shoval et al. | 726/2 |
| 8,539,551 | B2* | 9/2013 | Masuoka et al. | 726/3 |
| 2007/0089111 | A1* | 4/2007 | Robinson et al. | 718/1 |
| 2007/0185814 | A1 | 8/2007 | Boccon-Gibod et al. | |
| 2008/0184218 | A1* | 7/2008 | Largman et al. | 717/168 |
| 2009/0172820 | A1 | 7/2009 | Watson | |

FOREIGN PATENT DOCUMENTS

| | | |
|---|---|---|
| JP | 2008-201093 | 9/2008 |
| KR | 2001-0064246 | 7/2001 |
| KR | 10-0391932 | 7/2003 |
| KR | 10-2003-0082187 | 10/2003 |
| KR | 10-0783811 | 12/2007 |
| KR | 2008-0098337 | 11/2008 |
| KR | 10-2009-0070933 | 7/2009 |
| KR | 10-2009-0078551 | 7/2009 |
| KR | 10-0926075 | 11/2009 |
| WO | WO2007/007805 | 1/2007 |

* cited by examiner

APPARATUS AND METHOD FOR MANAGING DIGITAL RIGHTS USING VIRTUALIZATION TECHNIQUE

TECHNICAL FIELD

The present invention relates to a digital rights management apparatus and method, and in particularly to, a digital rights management apparatus and method using a virtual machine (VM) for controlling an access authorization function with respect to a user's document file in a region to which a virtualization technology is applied, which is a region independent from an application program.

BACKGROUND ART

Digital contents maintain the same quality as original contents even after being copied several times, unlike analog contents. When digital contents having such a property are propagated via an Internet communication medium, copy contents having the same quality as the original contents may spread rapidly and without limit. Thus, contents owners (for example, Hollywood movie producers in the U.S.) who produce contents by investing huge capital and great effort are reluctant to digitize or commercialize their own contents over the Internet. Such a climate brings about a disadvantage in that high quality contents are not supplied to contents consumers (users).

To solve this problem, as a method of encrypting and distributing or circulating digital contents, selling use authority and decryption keys of the digital contents to users, and reproducing the digital contents, a digital rights management (DRM) technology of providing users with different use authority of digital contents and protecting rights of digital contents has been developed.

The DRM technology is implemented by using an application program by itself, or by controlling an input and output operation of the application program from outside of the application program.

To implement the DRM technology by using the application program by itself involves the application program by itself preventing access to digital contents except to authorized users. This is the most stable method but the number of application programs supporting this is limited, and DRM technologies implemented by application programs differ from each other and are limited, and thus DRM technologies are limitedly unified and limitedly supplied.

Furthermore, technologies (applications filed by our firm (Korean Patent Application Nos. 2002-0072906 and 2007-0086361), which use a hooking technique by controlling an input and output operation of an application program from outside of the application program, implement a DRM function but are closely related to an implementation of the application program, which lowers stability since these technologies are sensitive to a version upgrade patch of the application program, and are very costly in terms of development.

Therefore, to solve these problems, an apparatus and method for enhancing stability and compatibility of the DRM function are required.

DETAILED DESCRIPTION OF THE INVENTION

Technical Problem

The present invention provides an apparatus and method for enhancing stability of digital rights management (DRM).

The present invention also provides an apparatus and method for providing users with different use authority with respect to a security document while enhancing stability of DRM.

The present invention also provides an apparatus and method for generating a virtual machine (VM) corresponding to authorization of a document file to be accessed by a user and allowing the user access to the document file in an independent region.

Technical Solution

According to an aspect of the present invention, there is provided a digital rights management (DRM) apparatus comprising: a file; and a virtual machine (VM) management unit for controlling a user's authority function to access the file in a region to which a virtualization technology is applied, which is a region independent from an application program of the file.

According to another aspect of the present invention, there is provided a DRM method comprising: a VM management operation of controlling a user's authority function to access a file in a region to which a virtualization technology is applied, which is a region independent from an application program of the file.

Advantageous Effects

As described above, the present invention relating to an apparatus and method for enhancing stability and compatibility of a digital rights management (DRM) function generates a virtual machine (VM) that is a virtual space corresponding to authority of a user when the user is given access to a document file and allows the user access to the document file in a virtual region, thereby solving a problem of reduction in stability due to a close relation between an application program and the conventional DRM, and reducing development expenses of a DRM system.

MODE OF THE INVENTION

Figure 1:
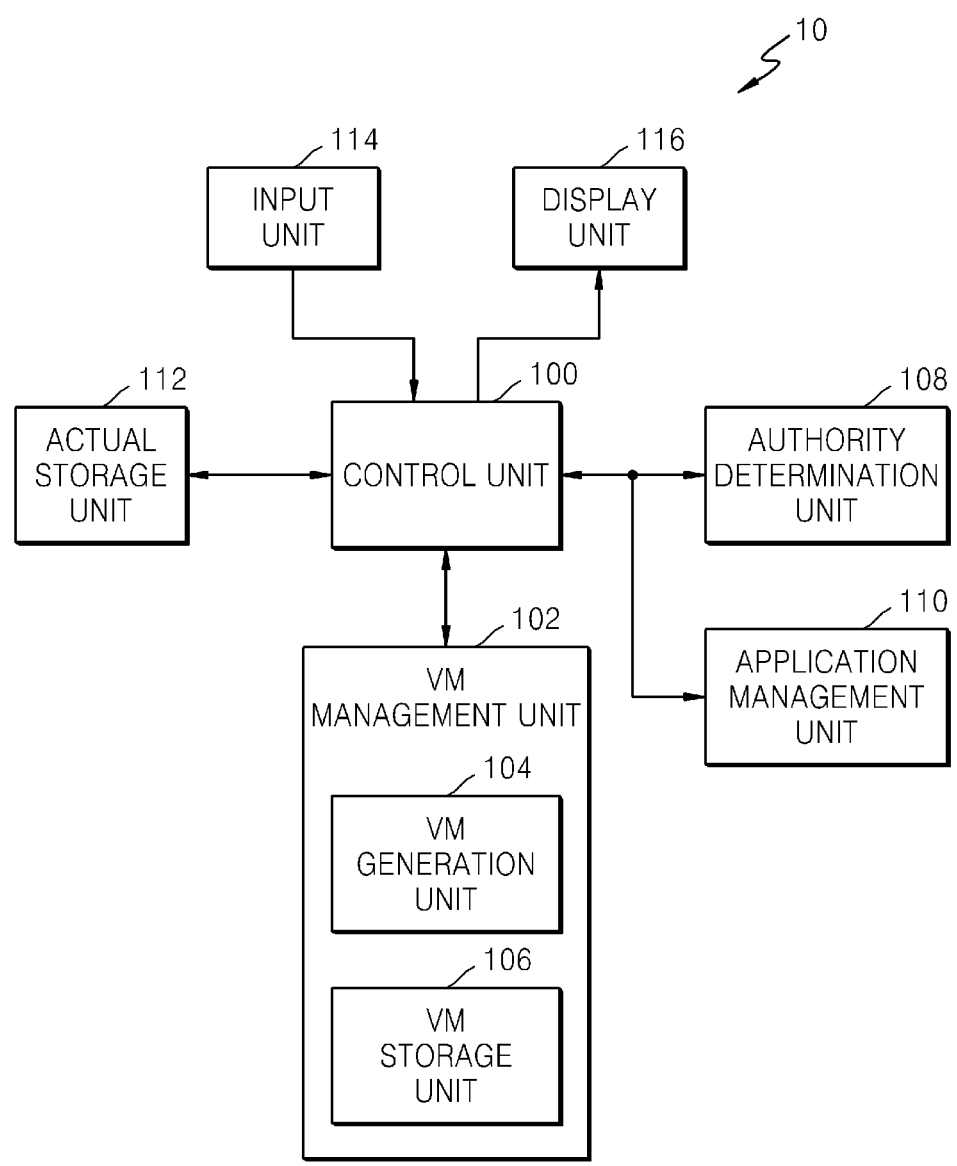
FIG. 1 is a block diagram of a digital rights management (DRM) apparatus for enhancing stability of a DRM function according to an embodiment of the present invention.

FIG. 1 is a block diagram of a digital rights management (DRM) apparatus 10 for enhancing stability of a DRM function according to an embodiment of the present invention.

Referring to FIG. 1, the DRM apparatus 10 may include a control unit 100, a virtual machine (VM) management unit 102, an authority determination unit 108, an application management unit 110, an actual storage unit 112, an input unit 114, and a display unit 116. The VM management unit 102 may include a VM generation unit 104 and a VM storage unit 106. In this regard, the actual storage unit 112 may store a document file.

The control unit 100 of the DRM apparatus 10 controls a general operation of the DRM apparatus 10. For example, the control unit 100 processes and controls execution of a program, and, if a user is sensed accessing the document file, according to the present invention, processes generation of a VM corresponding to a user's authority to access to the document file, in addition to a general function. Thereafter, the control unit 100 processes authorization to access a range corresponding to the user's authority in an independent space of the generated VM. In this regard, the document file refers to a type of file indicating electronic information but is not limited thereto, and may be applied to all multimedia files indicating electronic information as well as a document.

The VM management unit 102 processes generation of a VM corresponding to the user's authority according to an instruction of the control unit 100, and processes storage of changed content of a document accessed through the VM or newly generated content thereof in the VM storage unit 106. Furthermore, if completion of the user's access to the document file is sensed, the VM management unit 102 processes destruction of the generated VM. At this time, if it is determined that the document is changed by a user who has editing authority, the VM management unit 102 encrypts the document including the changed document as a DRM security document and copies the encrypted DRM security document to the actual storage unit 112 before destroying the VM.

That is, the VM management unit 102 processes generation of the VM corresponding to the user's authority and destruction of the VM through the VM generation unit 104.

The VM generation unit 104 of the VM management unit 102 generates the VM corresponding to the user's authority to access the document file and destroys the VM under control of the VM management unit 102.

The VM storage unit 106 of the VM management unit 102 temporarily stores a document file created while accessing the document file through the VM according to the user's authority, i.e. a changed document file or a newly created document file, during the generation of the VM. In this regard, the document file stored in the VM storage unit 106 is encrypted and stored in such a way that the document file can be determined through a corresponding VM, and is deleted when the VM is destroyed.

The authority determination unit 108 determines the authority of the user who tries to access the document file, and provides the control unit 100 with the result of the determination. If access to a non-security document is sensed, the application management unit 110 executes an application to execute a corresponding document file. Furthermore, if the user tries to access a security document file according to the present invention, a key necessary for decryption is obtained through a process of determining the user's authority, and a decrypted document file is transferred to the VM management unit 102 under control of the control unit 100. Thereafter, the application management unit 110 processes execution of the application corresponding to the document file accessed by the user.

The actual storage unit 112 is a place where a document file is stored, and may include a hard disk, read only memory (ROM), or flash ROM, etc.

The input unit 114 includes a plurality of functional keys for interfacing with the user, and provides the control unit 100 with a key input data (for example, a request to access a document file, etc.) according to a user's command. The input unit 114 may provide the control unit 100 with input data through a separate input device, such as a tablet, a mouse, etc.

The display unit 116 includes a display means for interfacing with the user, and may use, for example, a color liquid crystal display (LCD). The display unit 116 may include a touch input device and be used as an input device if the display unit 116 is applied to a touch input based apparatus.

Although the function of the VM management unit 102 may be performed by the control unit 100 of the DRM apparatus 10, the particular implementations separately shown and described herein are illustrative examples of the invention described for the sake of brevity, and are not intended to otherwise limit the scope of the invention in any way, and it will be understood by those of ordinary skill in the art that various changes in form and details may be made therein without departing from the spirit and scope of the invention. For example, the functions of the VM management unit 102 may be configured to be processed by the control unit 100.

An apparatus for generating a VM to provide users with different authorities access to a security document in order to solve a problem of reducing safety of the DRM in a close connection with an application program was described above. Hereinafter, a method of generating a VM to provide users with different authorities access to a security document by using the apparatus according to the present invention will now be described.

Figure 2:
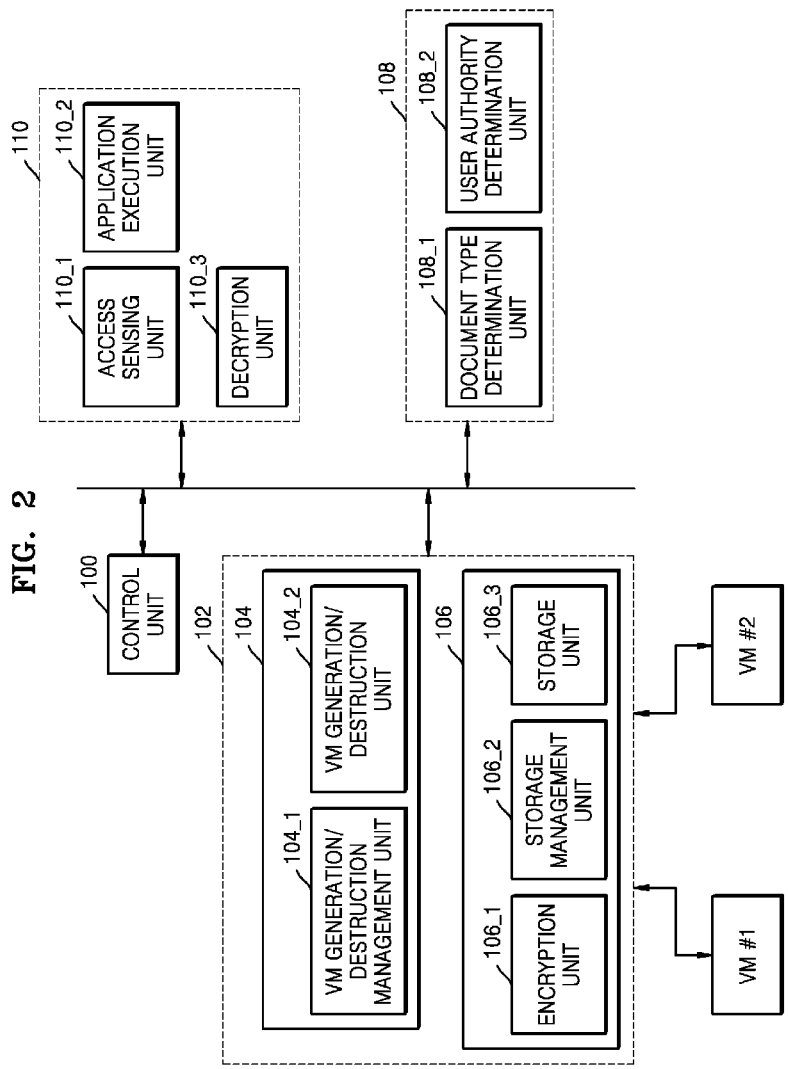
FIG. 2 is a detailed block diagram of the DRM apparatus of FIG. 1.

FIG. 2 is a detailed block diagram of the DRM apparatus 10 of FIG. 1.

Referring to FIG. 2, the DRM apparatus 10 includes the control unit 100, the application management unit 110, the authority determination unit 108, and the VM management unit 102. The application management unit 110 may include an access sensing unit 110_1, an application execution unit 110_2, and a decryption unit 110_3. The authority determination unit 108 may include a document type determination unit 108_1 and a user authority determination unit 108_2. The VM generation unit 104 of the VM management unit 102 may include a VM generation/destruction management unit 104_1 and a VM generation/destruction unit 104_2. The VM storage unit 106 of the VM management unit 102 may include an encryption unit 106_1, a storage management unit 106_2, and a storage unit 106_3. An operation of the DRM apparatus 10 of FIG. 2 will now be described below.

If the access sensing unit 110_1 of the application management unit 110 senses access to a document file, the document type determination unit 108_1 of the authority determination unit 108 determines whether the document file is a general document or a security document. If the document file is determined to be the general document, the application execution unit 110_2 drives an application program for executing the document file. Otherwise, if the document file is the security document, the user authority determination unit 108_2 determines a level of authority authorized to a user with respect to the document file. For example, the user authority determination unit 108_2 determines user's authority to determine whether the user is authorized to read or to read and print the document file.

If the user's authority is determined, the VM management unit 102 generates a VM under control of the control unit 100. The VM is generated or not generated according to a determination result of the authority determination unit 108. For example, the VM generation/destruction management unit 104_1 receives the determination result of the authority determination unit 108, and manages the generation of the VM for executing the document file in response to the determination result. The VM management unit 102 generates different VM according to a level of the user's authority, for example, a VM in the case where reading authority is authorized to the user and another VM in the case where reading and printing authorities are authorized to the user. Accordingly, when a VM is generated to execute a security document for which reading authority was previously authorized, even if the users requests to access the security document later, if reading authority is authorized to the user with respect to the security document, another VM is not generated but the document file is executed in the generated VM.

If the VM generation unit 104 generates the VM, the decryption unit 110_3 performs a decryption operation on an encrypted document through the authority determination process performed by the user authority determination unit 108_2. The decrypted document is stored in a storage space (the storage unit 106_3) of the VM storage unit 104. The decrypted document is executed in VMs VM#1, VM#2. Content edited by the user is stored in the storage unit 106_3 of the VM storage unit 104. When the decrypted document is stored, the encryption unit 106_1 encrypts a document file newly created or corrected in the VMs VM#1, VM#2 and stores the encrypted document file in the storage unit 106_3 in such a way that the encrypted document file can be accessed through the VMs VM#1, VM#2.

Figure 3:
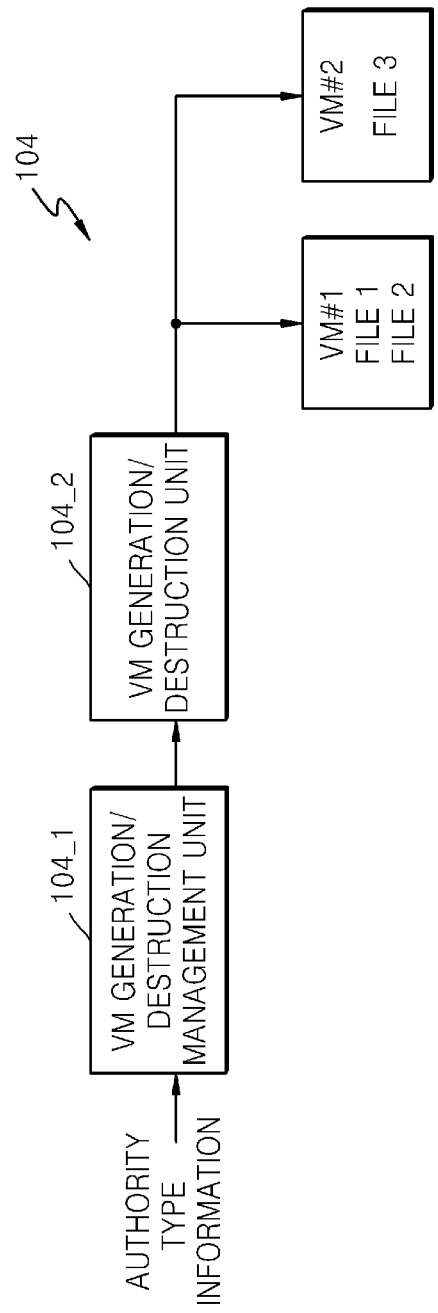
FIG. 3 is a block diagram of the DRM apparatus of FIG. 1 for explaining an example of generating a virtual machine (VM)

FIG. 3 is a block diagram of the DRM apparatus 10 of FIG. 1 for explaining an example of generating a VM.

Referring to FIG. 3, the VM generation/destruction management unit 104_1 manages an operation of generating a VM in response to an authority determination result of the authority determination unit 108. For example, the VM generation/destruction management unit 104_1 receives authority type information (information indicating a level of user's authority with respect to a document file), and controls the VM generation/destruction unit 104_2 to generate the VM. The VM generation/destruction unit 104_2 additionally generates or does not generate a VM according to the authority type information. For example, if the first VM VM#1 for executing a file 1 is previously generated, and reading and printing of the file 1 are allowed on the first VM VM#1, when a user authorized to read and print a predetermined security document (file 2) tries to execute the security document (file 2), another VM is not generated but the security document (file 2) is executed on the first VM VM#1. On the other hand, if the user is authorized to read, print, and edit a predetermined security document (file 3), the second VM VM#2 for executing the security document (file 3) is generated, the security document (file 3) is executed on the second VM VM#2, and reading, printing, and editing of the security document (file 3) are allowed.

Figure 4:
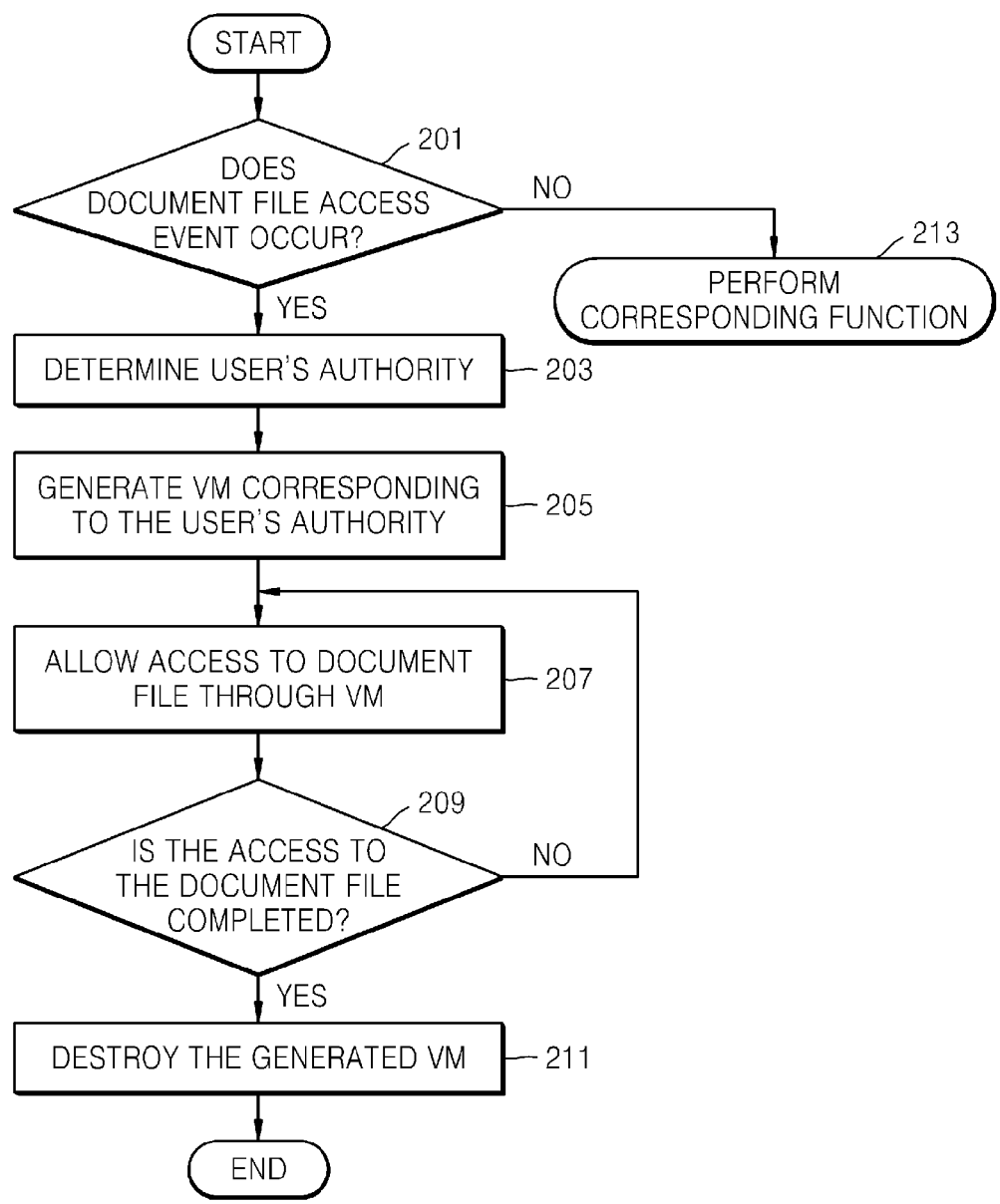
FIG. 4 is a flowchart of a document file access process performed by an apparatus according to an embodiment of the present invention.

FIG. 4 is a flowchart of a document file access process performed by an apparatus according to an embodiment of the present invention.

Referring to FIG. 4, the apparatus determines whether a document file access event occurs in operation 201. In this regard, the document file access event is used to execute a digital document file by a user. The digital document file may be a security document that is a document file to which DRM is applied or a general document that is a document file to which DRM is not applied. The digital document file to be executed by the user includes all of a document file, a drawing document, a multimedia document, etc.

If the apparatus determines that the document file access event does not occur in operation 201, the apparatus performs a corresponding function (for example, enters a standby mode) in operation 213.

Meanwhile, if the apparatus determines that the document file access event occurs in operation 201, the apparatus performs a process of determining a user's authority in operation 203. In this regard, the user's authority that is authorized to the user with respect to a security document file includes use authorities such as reading, editing, printing, a release of encryption, a change of authority, etc. If the apparatus determines that the document file access event of operation 201 is an access event of the general document, the apparatus does not perform operation 203 but performs a general document file access process.

In operation 205, the apparatus for determining the user's authority processes generation of a VM corresponding to the user's authority determined in operation 203. In operation 205, an environment for executing an application program to which a virtualization technique is applied and corresponding to the user's authority is generated. The VM means a space independent from the environment for executing the application program.

Thereafter, the apparatus allows a user access to a document file through the generated VM in operation 207. In operation 207, an application for executing the document file is executed to allow the user access to the document file through the generated VM. When the apparatus determines that the document file accessed by the user through the VM is stored while the user accesses the document file through the VM, the apparatus processes encryption of the document file to be stored and storage thereof in a VM storage unit that is a specific storage region determined only by the VM. In this regard, the apparatus generates the VM corresponding to the user's authority with respect to the document file, and thus the user cannot be given access to the document file that is not authorized by the user.

For example, if the apparatus senses access to a document file by a user authorized to read and print the document file, the apparatus generates a VM for access to the document file. In this regard, the VM is to provide access authorities corresponding to reading and printing of the document file, executes an application capable of determining the document file, and allows access authorities like reading and printing of the document file corresponding to the user's authorities.

Thereafter, the apparatus determines whether completion of the user's access to the document file is sensed in operation 209.

If the apparatus determines that the completion of the user's access to the document file is not sensed in operation 209, the apparatus goes back to operation 207 to perform a process of allowing the user's access to the document file through the VM, and proceed with operation 209. Alternatively, the apparatus may repeatedly perform operation 209 to sense the completion of the user's access to the document file.

Otherwise, if the apparatus determines that the completion of the user's access to the document file is sensed in operation 209, the apparatus processes destruction of the VM in operation 211. In this regard, the apparatus may process deletion of the document file stored in the VM storage unit at the time the VM is destroyed, before destroying the VM authorized to edit the document file, and copying of the document file stored in the VM storage unit as a DRM security document file to an original location of an actual storage unit to reflect content edited in the VM on an actual user file.

Thereafter, the apparatus completes the above algorithm.

Figure 5:
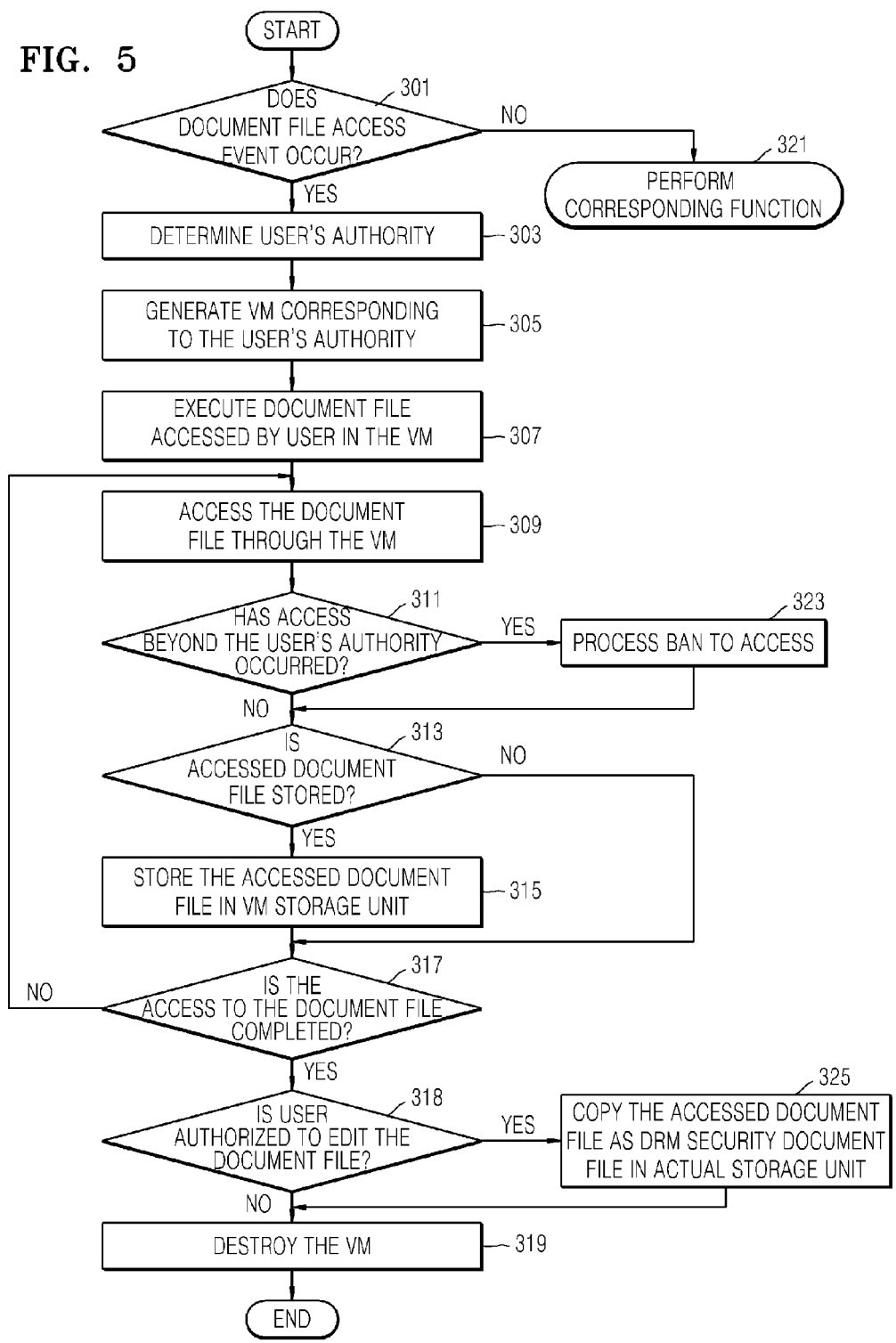
FIG. 5 is a flowchart of a document file access process performed by an apparatus according to another embodiment of the present invention.

FIG. 5 is a flowchart of a document file access process performed by an apparatus according to another embodiment of the present invention.

Referring to FIG. 5, the apparatus determines whether a document file access event occurs in operation 301. In this regard, the document file access event is used to execute a digital document file by a user. The digital document file may be a security document that is a document file to which DRM is applied or a general document that is a document file to which DRM is not applied. In relation to FIG. 5, access to the security document will be described. That is, if the apparatus determines access to the general document, the apparatus does not perform a process according to the present invention but performs a general document file access process.

If the apparatus determines that the document file access event does not occur in operation 301, the apparatus performs a corresponding function (for example, a standby mode) in operation 321.

Meanwhile, if the apparatus determines that the document file access event, i.e. access to the security document, occurs in operation 301, the apparatus determines a user's authority in operation 303.

In this regard, the user's authority authorized to the user with respect to a security document file includes use authorities such as reading, editing, printing, a release of DRM encryption, a change of DRM authority, etc. as described above.

In operation 305, the apparatus for determining the user's authority processes generation of a VM corresponding to the user's authority determined in operation 303. In operation 305, as described above, the VM that is a space independent from an environment for executing an application program (an environment to which a virtualization technique is not applied) is generated. Thus, the apparatus may process generation of an environment for executing the application program to which the virtualization technique is applied and corresponding to the user's authority so that the VM can be given access to the document file corresponding to DRM.

Thereafter, the apparatus allows the VM to execute the document file to be accessed by the user in operation 307. That is, the apparatus drives an application for executing the document file to be accessed by the user through the VM so that the document file is executed.

Then, the apparatus performs a user access process on the document file executed by the VM to which the virtualization technique is applied in operation 309, and determines whether access to the document file occurs beyond the user's authority in operation 311.

If the apparatus determines that the access to the document file occurs beyond the user's authority in operation 311, the apparatus processes a ban on access to the document file in operation 323 and determines whether the user stores the accessed document file in operation 313. In this regard, processing of the ban on access to the document file is to limit access to the document file beyond the user's authority. If the user access (for example, printing) to the document file beyond the user's authority, a function (for example, printing) regarding the access may be inactivated, or a pop up window informing that the access is not allowed may be output.

Meanwhile, if the apparatus determines that the access to the document file does not occur beyond the user's authority in operation 311, the apparatus performs operation 313 to determine whether the user stores the accessed document file.

If the apparatus determines that the user does not store the accessed document file in operation 313, the apparatus determines whether completion of the user's access to the document file is sensed in operation 317.

If the apparatus determines that the user stores the accessed document file in operation 313, the apparatus processes storage of the document file in a VM storage unit in operation 315.

In this regard, the apparatus processes encryption and storage of a document file newly generated or corrected by the VM in such a way that the document file can be accessed by the VM.

Thereafter, the apparatus performs operation 317 to determine whether completion of the user's access to the document file is sensed.

If the apparatus determines that the completion of the user's access to the document file is not sensed in operation 317, the apparatus goes back to operation 309 to perform the user access process on the document file through the VM.

Meanwhile, if the apparatus determines that the completion of the user's access to the document file is sensed in operation 317, the apparatus determines whether the user who executes the document file is authorized to edit the document file in operation 318.

If the apparatus determines that the user is not authorized to edit the document file in operation 318, the apparatus processes destruction of the VM used to access the document file in operation 319. In this regard, the apparatus deletes the document file stored in the VM storage unit while accessing the document file.

Otherwise, if the apparatus determines that the user is authorized to edit the document file in operation 318, the apparatus processes copying of the document file stored in the VM storage unit in operation 315 as a DRM security document file to an original location of an actual storage unit in operation 325, and goes back to operation 319 to destroy the VM used to access the document file.

Thereafter, the apparatus completes the algorithm.

Figure 6:
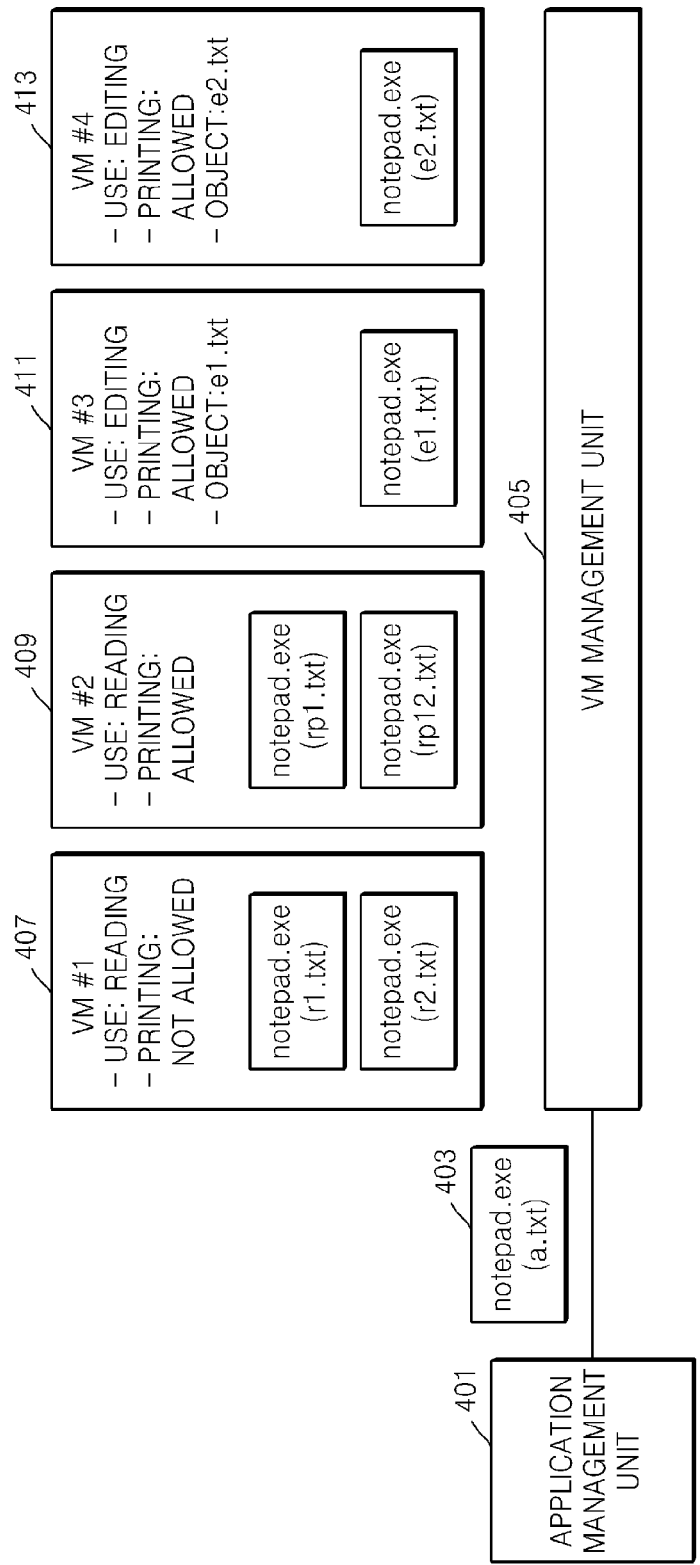
FIG. 6 is a block diagram for explaining a VM generation process performed by an apparatus according to an embodiment of the present invention.

FIG. 6 is a block diagram for explaining a VM generation process performed by an apparatus according to an embodiment of the present invention.

Referring to FIG. 6, the apparatus senses a user accessing a document file by using an application management unit 401.

That is, if it is assumed 403 that a user double-clicks a notepad document (a text document connected to Notepad.exe), the apparatus may determine that the user gives access to the document file through an application management unit 401.

Thus, a VM management unit 405 determines the user's authority with respect to the document file to be accessed and generates a VM regarding the user's authority.

In this regard, the VM management unit 405 may generate a plurality of VMs 407, 409, 411, and 413 in the apparatus to allow each of the VMs 407, 409, 411, and 413 to access a document with respect to different authorities.

For example, the apparatus may generate four or more VMs according to user's authorities as shown in FIG. 5. The VM 1 VM#1 407 is used by two documents r1.txt and r2.txt authorized for the user to read through notepad.exe. The VM 2 VM#2 409 is used by two documents rp1.txt and rp2.txt authorized for the user to read and print through notepad.exe. In the present embodiment, different VMs are used on the assumption that information included in e1.txt is not allowed to move to e2.txt.

The VM 1 VM#1 407 generated by the VM management unit 405 is allowed to read the documents r1.txt and r2.txt and thus the user may give access to the documents r1.txt and r2.txt within a range of reading the documents r1.txt and r2.txt through the VM 1 VM#1 407. Since the VM 1 VM#1 407 is used to read the documents r1.txt and r2.txt, when the VM 1

VM#1 407 is destroyed, all files stored in a VM storage unit are deleted. Thus, a user's operation in the VM 1 VM#1 407 is not stored in an actual storage unit. Furthermore, since the VM 1 VM#1 407 is not allowed to print the documents r1.txt and r2.txt, a user's printing operation is blocked.

Furthermore, the VM 2 VM#2 409 generated by the VM management unit 405 is allowed to read and print the documents rp1.txt and rp2.txt and thus the user may give access to the documents rp1.txt and rp2.txt within a range of reading and printing the documents rp1.txt and rp2.txt through the VM 2 VM#2 409. When the VM 2 VM#2 409 is destroyed, all files stored in the VM storage unit are deleted like the VM 1 VM#1 407. However, since the VM 2 VM#2 409 is allowed to print the documents rp1.txt and rp2.txt, a user's printing operation is not blocked.

Furthermore, the VM 3 VM#3 411 generated by the VM management unit 405 is allowed to read, print, and edit a document and thus the user may be given access to the document within a range of reading, printing, and editing the document through the VM 3 VM#3 411. In this regard, the VM 3 VM#3 411 can read, edit, and print a document file e1.txt connected to Notepad.exe. When the VM 3 VM#3 411 is destroyed, the document file e1.txt among files stored in the VM storage unit is copied in the actual storage unit unlike the VM 1 VM#1 407 and VM 2 VM#2 409.

The VM 4 VM#4 413 generated by the VM management unit 405 is the same as the VM 3 VM#3 411, except for a document file e2.txt.

That is, the apparatus according to the present invention enables access to a document file by generating a VM corresponding to the user's authority. As an example, the following operation may be processed to generate a VM and access the document file e1.txt.

First, if a user double-clicks a shell program to use the document file e1.txt, the application management unit 401 may sense the double-click and determine the user the document file e1.txt.

As described above, if the user is sensed accessing the document file e1.txt, an authority determination unit of the apparatus determines whether the document file e1.txt to which the user is given access is a security document or a general document. If the authority determination unit of the apparatus determines that the document file e1.txt to which the user is given access is the general document, the authority determination unit transfers a user's request to the application management unit 401 to perform a general document file access process.

If the authority determination unit of the apparatus determines that the document file e1.txt to which the user is given access is the security document, the authority determination unit determines the user's authority with respect to the security document.

That is, the authority determination unit determines that the user is authorized to read, edit, and print the document file e1.txt and provides the VM management unit 405 with the user's authority.

Thus, the VM management unit 405 generates the VM 3 VM#3 411 having properties of use=editing, printing=allowed, object=e1.txt.

Thereafter, the apparatus enables the VM management unit 405 to process opening of the security document through the VM 3 VM#3 411 and request storage of an encrypted security document in a virtual storage space used by the apparatus.

Accordingly, the application management unit 401 transfers a decrypted security document through a license determination process to the VM 3 VM#3 411. The VM 3 VM#3 411 stores the decrypted security document in a VM storage unit thereof (an encrypted storage space accessible by the VM 3 VM#3 411).

Thus, the VM 3 VM#3 411 executes an application program for editing the stored security document and stores content of the security document edited by the user. In this regard, the VM 3 VM#3 411 stores the edited content in the VM storage unit that is a specific storage region of the VM management unit 405.

If the user's access to the document file, i.e. user's editing of the document file, is completed during the editing process, the VM management unit 405 stores the changed document file e1.txt as a DRM security document file to an original location, and destroys the VM 1 VM#1 407, the VM 2 VM#2 409, the VM 3 VM#3 411, and the VM 4 VM#1 413. That is, the VM management unit 405 stores an edited document file in the actual storage unit of the apparatus and deletes the edited content stored in the VM storage unit.

Figure 7:
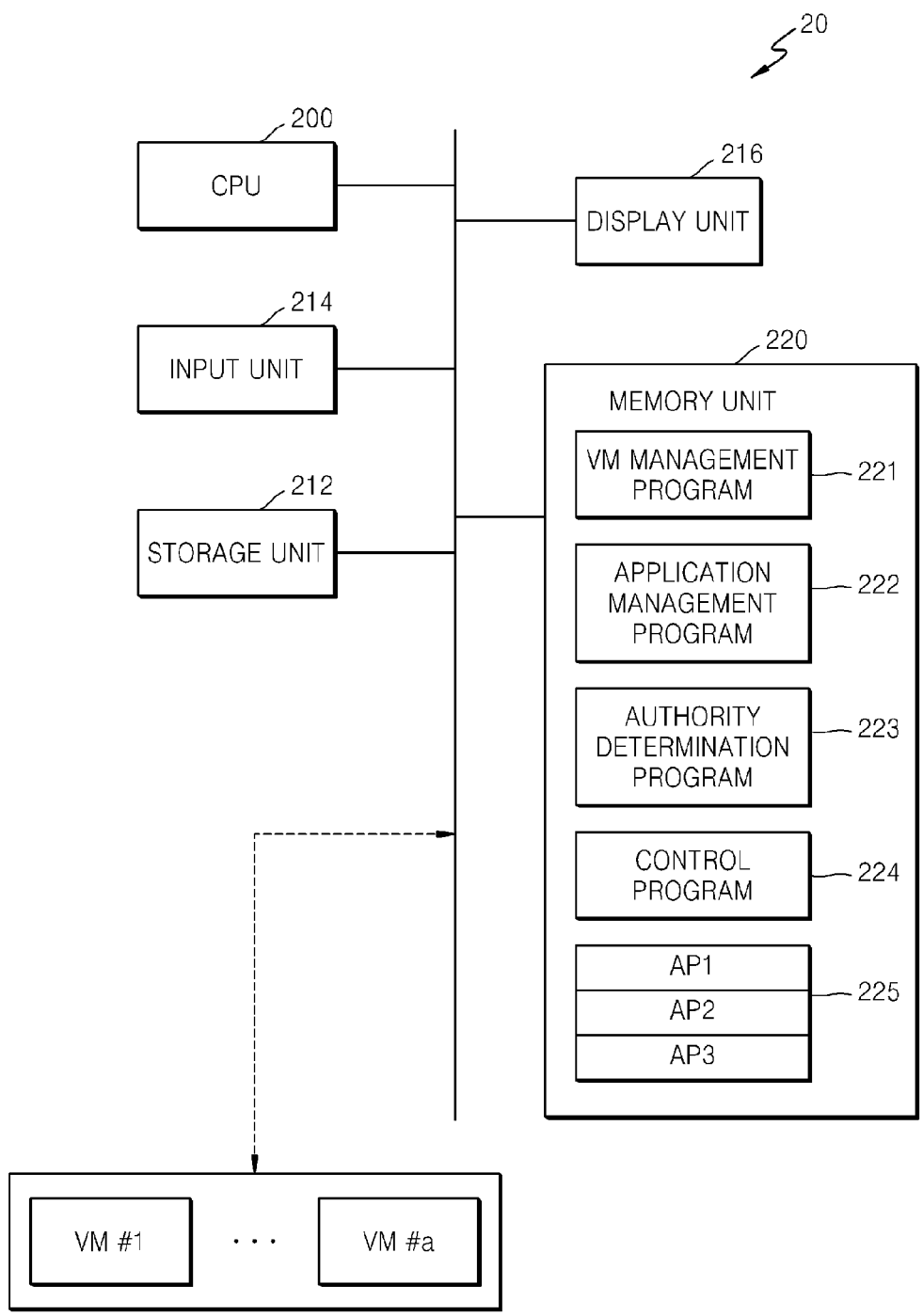
FIG. 7 is a block diagram of a DRM apparatus implemented in a software manner according to an embodiment of the present invention.

FIG. 7 is a block diagram of a DRM apparatus 20 implemented in a software manner according to an embodiment of the present invention. Referring to FIG. 7, the DRM apparatus 20 includes a CPU 200 for controlling a system generally, and a memory unit 220 in which a program is stored to perform a DRM operation. Examples of the program include a VM management program 221 for managing generation and destruction of a VM, an application management program 222 for managing execution of a document file, an authority determination program 223 for determining a user's authority, and a control program 224 for generally controlling execution of a function through the VM management program 221, the application management program 222, and the authority determination program 223 and may be loaded in the memory unit 220. A variety of programs of which execution is controlled by the application management program 222, for example, a word program, a Hangul program, a text program for executing documents, and one or more various application programs 225 AP1 through AP3, may be loaded in the memory unit 220.

The programs are stored in a storage unit 212, and may be loaded in the memory unit 220 if the DRM function is performed when access to the document file is sensed. A document file that is a general document that does not need security or a security document that needs security is stored in the storage unit 212. An input unit 214 and a display unit 216 for interfacing with a user are further shown in FIG. 7.

When the user is sensed accessing the document file, the VM management program 221, the application management program 222, the authority determination program 223, and the control program 224 are loaded in the memory unit 220. The authority determination program 223 is driven to determine whether the document file is the security document or not and to determine the user's authority. According to the determination results, the VM management program 221 is driven to generate one or more VMs VM#1 through VM#a. The application management program 222 is driven to execute the document file in the VM VM#1 through VM#a. The operations of reading, printing, and editing the document file are performed in the VM VM#1 through VM#a according to the user's authorities. If the user is sensed accessing the document file, an edited document is stored in the storage unit 212 according to whether the user is authorized to edit the document file, and then the VM VM#1 through VM#a are destroyed.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A digital rights management (DRM) apparatus comprising:
   a first file and a second file adapted to comprise digital right contents; and
   a virtual machine (VM) management unit adapted to control a user's authority function to access the file in a region to which a virtualization technology is applied, which is a region independent from an application program of the file;
   wherein the VM management unit determines a user's authority to access the first file and the second file, generates a first VM for executing the first file corresponding to the determined user's authority for the first file, and, if the user's authority between the first file and the second file is the same, executes the second file on the first VM, and if not, executes the second file on a second VM; and
   wherein the VM management unit is stored in a storage unit of a computing system, loaded in a memory unit of the computing system and performed by a Central Processing Unit (CPU) of the computing system.

2. The DRM apparatus of claim 1, wherein the VM management unit further comprises a VM storage unit adapted to temporarily store a new file or changed file generated while accessing the first file through the generated first VM.

3. The DRM apparatus of claim 2, wherein the VM management unit is adapted to destroy the generated first VM after accessing the first file through the generated first VM and determining that the user's access to the first file is completed.

4. The DRM apparatus of claim 3, further comprising a DRM security document file, the DRM security document file corresponding to the temporarily stored file and stored in the VM management unit in an actual storage unit before destroying the generated first VM, if it is determined that the user's access to the first file is completed.

5. A DRM method comprising: a VM management operation of controlling a user's authority function to access a first file and a second file adapted to comprise digital right contents in a region to which a virtualization technology is applied, which is a region independent from an application program of the first file and the second file,
   wherein the VM management operation comprises determining a user's authority to access the first file and the second file, generating a first VM for executing the first file corresponding to the determined user's authority for the first file, and, if the user's authority between the first file and the second file is the same, executing the second file on the first VM, and if not, execute the second file on a second VM.

6. The DRM method of claim 5, wherein the VM management operation comprises:
   if the user is sensed accessing the first file, determining a user's authority to access the first file;
   generating the first VM corresponding to the determined user's authority; and
   accessing the first file through the generated first VM.

7. The DRM method of claim 6, further comprising:
   if a changed file or a new file is generated while accessing the first file through the generated first VM, temporarily storing the generated file in a VM storage unit.

8. The DRM method of claim 7, further comprising:
   destroying the generated first VM after accessing the first file through the generated first VM and determining that the user's access to the first file is completed.

9. The DRM method of claim 8, further comprising: after storing the temporarily stored file as a DRM security document file in an actual storage unit before destroying the generated first VM, deleting the temporarily stored file.

10. The DRM apparatus of claim 3, wherein the VM management unit is adapted to destroy the generated first VM after accessing the first file and the second file through the generated first VM and determining that the user's access to the first file and the second file are completed, if the user's authority between the first file and the second file is the same.

11. The DRM method of claim 7, further comprising: destroying the generated first VM after accessing the first and the second file through the generated first VM and determining that the user's access to the first file and the second file are completed, if the user's authority between the first file and the second file is the same.

12. A digital rights management (DRM) apparatus comprising:
    a first file and a second file adapted to comprise digital right contents; and
    a virtual machine (VM) management unit adapted to control a user's authority function to access the file in a region to which a virtualization technology is applied, which is a region independent from an application program of the file;
    wherein the VM management unit determines a user's authority to access the first file and the second file, generates a first VM for executing the first file corresponding to the determined user's authority for the first file and generates a second VM for executing the second file corresponding to the determined user's authority for the second file; and
    wherein the VM management unit is stored in a storage unit of a computing system, loaded in a memory unit of the computing system and performed by a Central Processing Unit (CPU) of the computing system.

13. The DRM apparatus of claim 12, wherein the VM management unit further comprises a VM storage unit adapted to temporarily store a new file or changed file generated while accessing the first file through the generated first VM.

14. The DRM apparatus of claim 13, wherein the VM management unit is adapted to destroy the generated first VM after accessing the first file through the generated first VM and determining that the user's access to the first file is completed.

15. The DRM apparatus of claim 14, further comprising a DRM security document file, the DRM security document file corresponding to the temporarily stored file and stored in the VM management unit in an actual storage unit before destroying the generated first VM, if it is determined that the user's access to the first file is completed.

16. A DRM method comprising: a VM management operation of controlling a user's authority function to access a file and a second file adapted to comprise digital right contents in a region to which a virtualization technology is applied, which is a region independent from an application program of the first and the second file,
    wherein the VM management operation comprises determining a user's authority to access the first file and the second file, generating a first VM for executing the first file corresponding to the determined user's authority for the first file and generating a second VM for executing the second file corresponding to the determined user's authority for the second file.

17. The DRM method of claim 16, wherein the VM management operation comprises:
if the user is sensed accessing the first file, determining a user's authority to access the first file;
generating the first VM corresponding to the determined user's authority; and
accessing the first file through the generated first VM.

18. The DRM method of claim 16, further comprising:
if a changed file or a new file is generated while accessing the first file through the generated first VM, temporarily storing the generated first file in a VM storage unit.

19. The DRM method of claim 17, further comprising:
destroying the generated first VM after accessing the first file through the generated first VM and determining that the user's access to the first file is completed.

20. The DRM method of claim 18, further comprising:
after storing the temporarily stored file as a DRM security document file in an actual storage unit before destroying the generated first VM, deleting the temporarily stored file.

* * * * *